United States Patent [19]

Sato

[11] Patent Number: 4,773,509
[45] Date of Patent: Sep. 27, 1988

[54] BRAKE SYSTEM FOR BICYCLES

[76] Inventor: Masataro Sato, 191-banchi, Ooaza Ikenobe, Miki-cho, Kita-gun, Kagawa-ken, Japan

[21] Appl. No.: 56,282

[22] Filed: May 29, 1987

Related U.S. Application Data

[63] Continuation of Ser. No. 836,922, Mar. 6, 1986, abandoned.

[30] Foreign Application Priority Data

| May 7, 1985 | [JP] | Japan | 60-96465 |
| Jul. 26, 1985 | [JP] | Japan | 60-165087 |
| Oct. 9, 1985 | [JP] | Japan | 60-225838 |

[51] Int. Cl.⁴ ............................................. B62L 3/08
[52] U.S. Cl. ........................... 188/24.16; 74/480 R;
74/501.5 R; 74/502.2; 188/2 D
[58] Field of Search ............... 188/24.15, 24.16, 217,
188/2 D; 74/501.5 R, 501 B, 501 R, 480 R, 480 B, 490

[56] References Cited

U.S. PATENT DOCUMENTS

| 1,386,559 | 8/1921 | Fegely | 188/217 |
| 2,241,214 | 5/1941 | Milster | 188/16 X |
| 2,424,198 | 7/1947 | Tauscher | 74/501.5 R |
| 3,942,609 | 3/1976 | Hill | 188/24.16 |
| 4,057,127 | 11/1977 | Woodring | 188/24.16 |
| 4,351,418 | 9/1982 | Woodring et al. | 188/2 D X |

FOREIGN PATENT DOCUMENTS 2123501 2/1984 United Kingdom ............ 188/24.16

Primary Examiner—George E. A. Halvosa
Attorney, Agent, or Firm—Armstrong, Nikaido, Marmelstein & Kubovcik

[57] ABSTRACT

In a brake system for bicycles, a pair of operating transmission cables separately connected respectively to two brake levers are commonly connected to a connecting member carried on a body frame, for movement in a direction of cables pulled, and a pair of drive transmission cables separately connected respectively to both the brakes are commonly connected to the connecting member at its surface opposite to that at which the operating transmission cables are connected. In another aspect, a pivotally movable plate is carried on a support for swinging movement between a braking position and a non-braking position. One of drive transmission cables, which has at its one end an engaging member adapted to abut against the surface of the pivotally movable plate in the braking position and is movably passed through the pivotally movable plate, is connected at the other end thereof to one of brakes, while one of operating transmission cables which is connected at its one end to one of the brake levers is connected at the other end thereof to the engaging member. The other brake and the other brake lever are interconnected by the other drive transmission cable and the other operating transmission cable through the pivotally movable plate interposed therebetween.

4 Claims, 8 Drawing Sheets

BRAKE SYSTEM FOR BICYCLES

This application is a continuation of application Ser. No. 836,922 filed Mar. 6, 1986 Abd.

BACKGROUND OF THE INVENTION

1. Field of the Invention

The present invention relates to a brake system for bicycles, comprising brakes disposed respectively on front and rear wheels for operation interlockingly with the braking operation of brake levers disposed respectively on the opposite ends of a handlebar.

2. Description of the Prior Art

In such a conventional brake system for bicycles, it is common that a brake lever at the right end of a handlebar is connected through a brake wire to a front wheel brake and a brake lever at the left end of the handlebar is connected through a brake wire to a rear wheel brake.

When a quick braking is effected during travelling of a bicycle, however, an operational force provided by the hand more skilled than the other, e.g., by the right brake lever is apt to be larger than that provided by the other, resulting in a larger braking force applied to the front wheel. This may cause the miscontrol of the handlebar and the overturning of the bicycle. In some cases, a braking may be inevitably conducted by one hand and in such a case, the braking operation by only the front wheel brake might cause the overturning of the bicycle, which is dangerous, while the braking operation by only the rear wheel brake may not provide a satisfactory braking effect.

SUMMARY OF THE INVENTION

It is therefore an object of the present invention to provide a brake system for bicycles wherein even if either one of left and right brake levers is operated, front and rear brakes can be actuated.

It is another object of the present invention to provide a brake system for bicycle wherein the braking operation by one of braking levers causes the actuation of only one of brakes and the braking operation by the other brake lever causes the actuation of both the brakes, in consideration of the fact that it may be safety to effect the braking operation by only either one of front and rear wheel brakes, depending on the circumstances of a road.

According to the present invention, there is provided a brake system for bicycle of a type as described above, wherein a pair of operating transmission cables, separately connected respectively to the two brake levers, are commonly connected to a connecting member carried on a body frame, for movement in a direction of cables pulled, and a pair of drive transmission cables, separately connected respectively to the two brakes, are commonly connected to the connecting member at the side opposite to that at which the operating transmission cables are connected.

With such arrangement, when either one of the brake levers is operated, the front and rear brakes can be actuated.

In addition, according to another aspect of the present invention, there is provided a brake system for a bicycle of a type as described above, wherein a pivotally movable plate is carried on a support mounted on a body frame for swinging movement between a non-braking position and a braking position. One of drive transmission cables, which has at its one end an engaging member adapted to abut against the surface of the pivotally movable plate at the side of the braking position and is movably passed through the pivotally movable plate, is connected at the other end thereof to one of the brakes, while one of operating transmission cables, having one end connected to one of the braking levers, is connected at the other end thereof to the engaging member. The other brake and the other brake lever are interconnected by the other drive transmission cable and the other operating transmission cable through the pivotally movable plate interposed therebetween.

With such an arrangement, the operation of one brake lever can cause the one brake to be actuated and the operation of the other brake lever can cause both the brakes to be actuated, so that the braking condition can be changed depending on the circumstances of a road. Thus, safe and reliable braking can be provided.

BRIEF DESCRIPTION OF THE DRAWINGS

The above and other objects, features and advantages of the present invention will become apparent from the following description of preferred embodiments taken in conjunction with the accompanying drawings in which:

FIGS. 1 to 3 illustrate a first embodiment of the present invention, wherein FIG. 1 is a perspective view of the upper portion of a bicycle, FIG. 2 is enlarged view of a portion indicated by an arrow II in FIG. 1, and FIG. 3 is a sectional view taken along the line III—III in FIG. 2;

DESCRIPTION OF THE PREFERRED EMBODIMENT

The present invention will now be described in more detail by way of a preferred embodiment with reference to the accompanying drawings.

Figure 1:
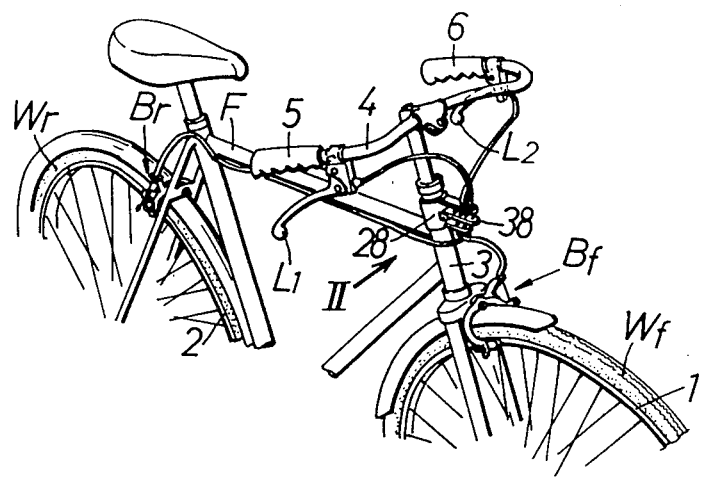
Figure 3:
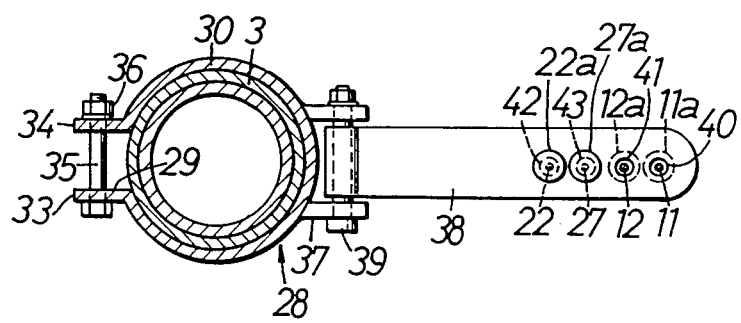
Figure 2:
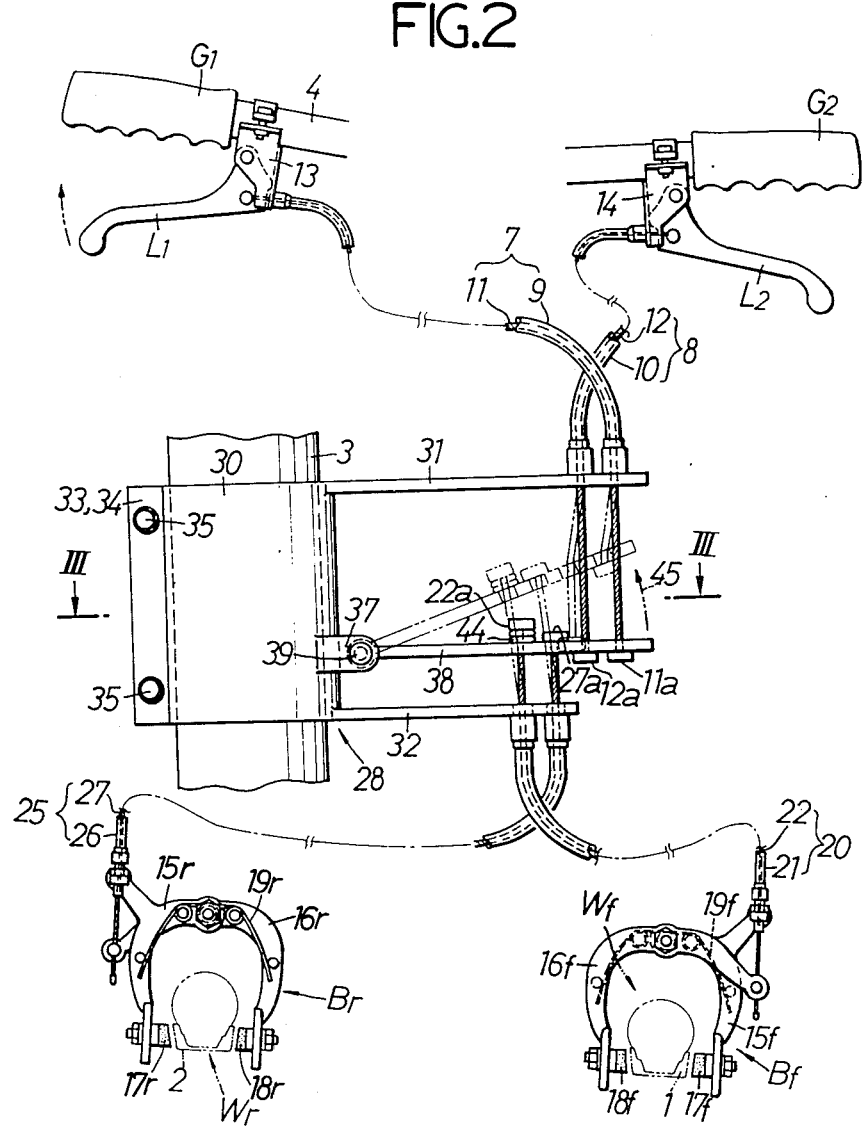

Referring first to FIGS. 1, 2 and 3, there is shown a brake system according to a first embodiment of the present invention, which includes a front wheel brake Bf attached to the front portion of a bicycle body frame F for providing a braking force under the influence of the friction against a rim 1 of a front wheel Wf. A rear wheel brake Br mounted on the rear portion of the body frame F provide a braking force under the influence of the friction against a rim 2 of a rear wheel Wr. A first brake lever L1 is carried on the right end of a handlebar 4 for pivotal movement toward and away from a grip G1 (or 5), the handlebar 4 being rotatably supported on a head pipe 3 at the front portion of the body frame F, and a second brake lever L2 is carried on the left end of the handlebar 4 for pivotal movement toward and away from the a grip G2 (or 6).

Operating transmission cables 7 and 8 are separately connected to the brake levers L1 and L2, respectively.

Each of the operating transmission cable 7 and 8 comprises an inner wire 11 or 12 movably inserted in an outer casing 9 or 10 which is fixed at one end to a mounting member 13 or 14 for mounting the brake lever L1 or L2 to the handlebar 4. One end of each the inner wire 11 and 12 is projected from one end of the outer casing 9 or 10 and connected to the brake lever L1 or L2.

The front and rear wheel brake Bf and Br are a caliper brake of the same construction, respectively. Each of the front and rear wheel brakes Bf and Br comprises a pair of actuator pieces 15f, 16f or 15r, 16r pivotally carried on the body frame F in such a manner to straddle the front or rear wheel Wf or Wr. Braking 17f, 18f or 17r, 18r are respectively mounted on the actuator pieces 15f and 16f or 15r and 16r and adapted to abut against the side surfaces of the rim 1 or 2, with a return spring 19f or 19r interposed between both the actuator pieces 15f, 16f or 15r, 16r.

A drive transmission cable 20 is connected to the front wheel brake Bf. More specifically, the drive transmission cable 20 comprises an inner wire 22 movably inserted through an outer casing 21 which is connected at its one end to one of actuator pieces 15f, one end of the inner wire 22 protruded from one end of the outer casing 21 being connected to the other actuator piece 16f.

In addition, one end of an outer casing 26 in a drive transmission cable 25 is connected to the one actuator piece 15r in the rear wheel brake Br, and one end of an inner wire 27 protruded from the outer casing 26 is connected to the other actuator piece 16r.

A support member 28 is fixed at the middle of the head pipe 3, and includes a cylindrically shaped mounting portion 30 having a single axially extending slit 29, and upper and lower connecting plates 31 and 32 projectedly mounted on the outer surfaces at the upper and lower ends of the mounting plates 30 at the side opposite to the slit 29, respectively. The head pipe 3 is inserted through the mounting plate 30, so that the support member 28 may be fixed to the head pipe 3 by clamping, with a bolt 35 and a nut 36, jaws 33 and 34 provided at the opposite edges of the slit 29.

A bracket 37 is integrally formed on the mounting plate 30 between the upper and lower connecting plates 31 and 32, and the base end of a pivotally movable plate 38 as a flat plate-like connecting member 38 is supported by the bracket 37 through a horizontal shaft 39.

The other ends of the respective outer casing 9 and 10 in the drive transmission cables 7 and 8 are fixed side by side to the upper connecting plate 31 in the vicinity of its leading end, and the respective other ends of the inner wires 11 and 12 protruded from the corresponding other ends of the outer casing 9 and 10 are movably passed through the upper connecting plate 31 and connected side by side to the pivotally movable plate 38 in the vicinity of its leading end. More particularly, a pair of through holes 40 and 41 are perforated side by side in the pivotally movable plate 38 in the vicinity of its leading end, and locking heads 11a and 12a engaging the lower surface of the pivotally movable plate 38 are provided on the corresponding ends of the inner wires 11 and 12 inserted through the through holes 40 and 41, respectively.

On the other hand, the other ends of the respective outer casing 21 and 26 in the transmitting cables 20 and 25 are fixed side by side to the lower connecting plate 32 in the vicinity of its leading end. The respective other ends of the inner wires 22 and 27 protruded from the corresponding other ends of the outer casing 21 and 26 are movably passed through the lower connecting plate 32 and connected to the pivotally movable plate 38. More particularly, a pair of through holes 42 and 43 are bored adjacent to each other in the pivotally movable plate 38 in the extension in the direction of through holes 40 and 41 arranged, and the other ends of the inner wires 22 and 27 are inserted through the through holes 42 and 43, respectively.

A locking head 27a, engaging the upper surface of the pivotally movable plate 38, is mounted on the end of the inner wire 27 close to the rear wheel brake Br. A locking head 22a similar to the locking head 27a is also mounted on the end of the inner wire 22 close to the front wheel brake Bf, and a resilient member 44 is interposed between the locking head 22a and the upper surface of the pivotally movable plate 38.

Description will now be made of the operation of this embodiment. To provide a braking force during travelling of a bicycle, either the first or second brake lever L1 or L2 may be operated to allow either the inner wire 11 or 12 in the operating transmission cable 7 or 8 to be pulled, so that the pivotally movable plate 38 is pivotally moved in the direction 45. This causes the inner wires 22 and 27 of the drive transmission cables 20 and 25 to be pulled, so that the front and rear wheel brakes Bf and Br are actuated to brake the front or rear wheels Wf and Wr. In this case, since the resilient member 44 is interposed between the pivotally movable plate 38 and the inner wire 22 close to the front wheel Bf, the pulling of the inner wire 22 slightly delayes. Thus, the actuation of the front wheel brake Bf is initiated slightly later than the initiation of the actuation of the rear wheel brake Br, thereby considerably reducing the risk of an overturning.

To provide a larger braking force, both of the brake levers L1 and L2 may be simultaneously operated, and in doing so, the inner wires 22 and 27 of the drive transmission cables 20 and 25 are forcefully pulled to give a larger braking force.

Figure 4:
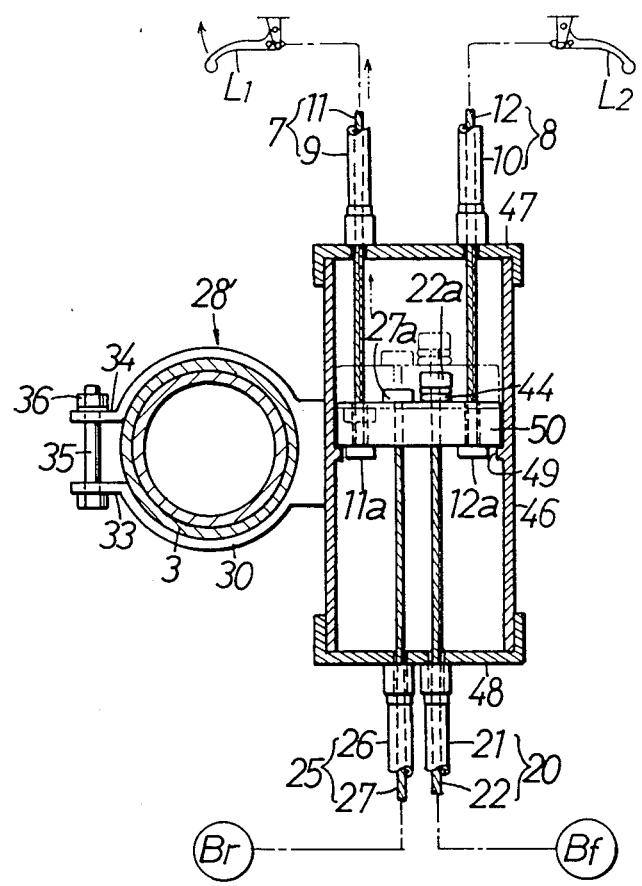
FIG. 4 is a sectional view corresponding to FIG. 3 for illustrating a second embodiment of the present invention.

FIG. 4 illustrates a second embodiment of the present invention, in which like reference characters are used to designate parts corresponding to those in the previously described embodiment.

A tube 46 closed at its opposite ends by cover members 47 and 48 is mounted on a support member 28' fixed over the head pipe 3 and has a connecting member 50 slidably contained therein for movement between restricting projection 49 raised at the middle on the inner surface of the tube 46 and one of the cover members 47.

The outer casing 9 and 10 of the operating transmission cables 7 and 8 are fixed to the one cover member 47, and the inner wires 11 and 12 of the operating transmission cables 7 and 8 are connected to the connecting member 50. The outer casings 21 and 26 of the drive transmission cables 20 and 25 are fixed to the other cover member 48. The inner wire 27 of the drive transmission cable 25 for the rear wheel brake Br is connected to the connecting member 50, while the inner wire 22 of the drive transmission cable 20 for the front wheel brake Bf is connected to the connecting member 50 through the resilient member 44.

With this second embodiment, it is possible to provide an effect similar to that in the first embodiment.

Figure 5:
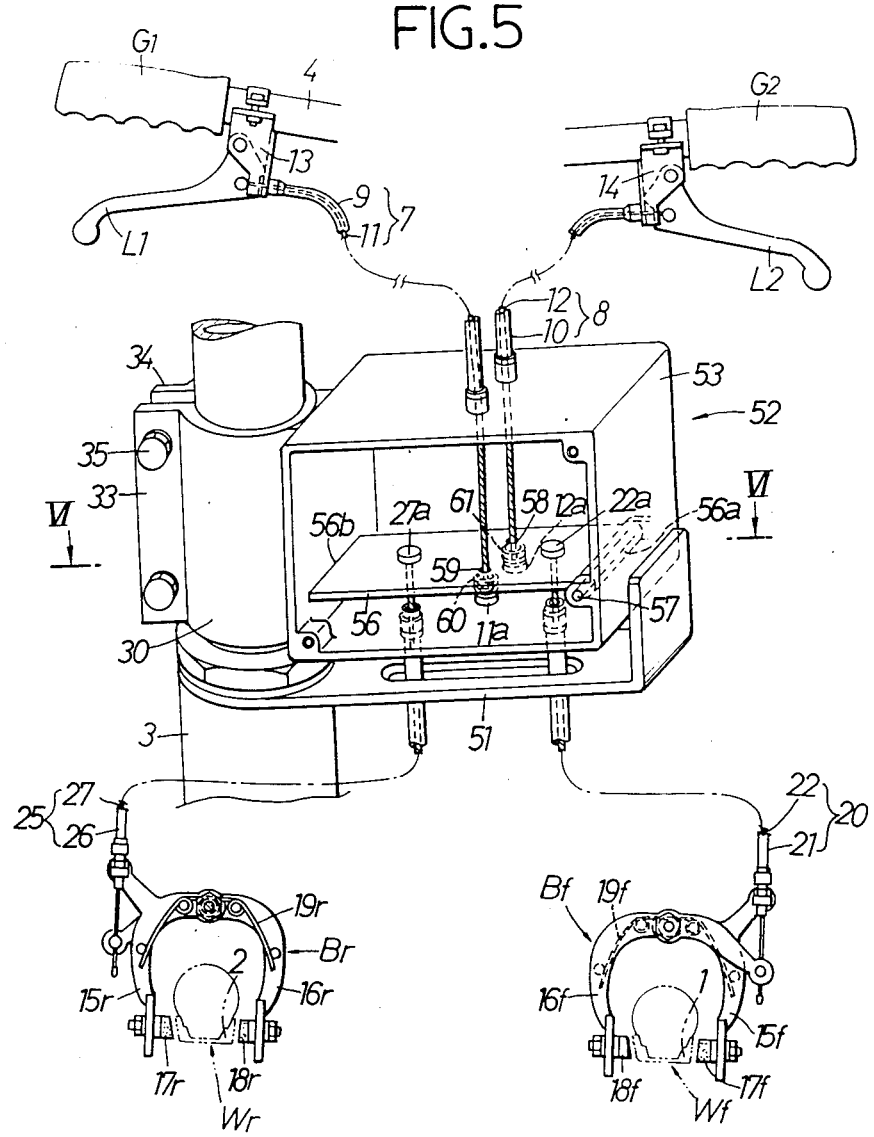
FIGS. 5 and 6 illustrates a third embodiment of the present invention, FIG. 5 being a perspective view corresponding to FIG. 2, and FIG. 6 being a sectional view taken along the line VI—VI in FIG. 5.
Figure 6:
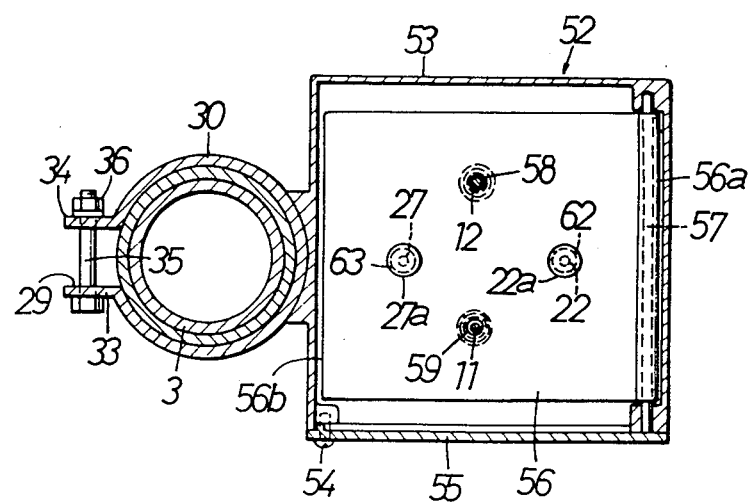

FIGS. 5 and 6 illustrate a third embodiment of the present invention, in which like reference characters and numerals denote like parts as in the previous embodiments.

An L-shaped support plate 51 is attached to the head pipe 3 for mounting a head lamp and a basket, and a casing 52 as a support is disposed above the support plate 51.

The cable casing 52 is comprised of a one side-opened box 53, and a cover member 55 detachably secured to the box 53 by a screw member 54 to close the opening of the box 53. The cable casing 52 is fixed to the head pipe 3 by the mounting portion 30 described in the previous first embodiment to define a space permitting the mounting of a head lamp and a basket on the support plate 51.

A pivotally movable plate 56 is contained within the cable casing 52 and has a base end 56a supported on the inner surface of the cable casing 52 through a horizontal support pin 57. Therefore, the pivotally movable plate 56 is swingable within the cable casing 52 in the upward and downward directions.

The other ends of the respective outer casings 9 and 10 in the pair of operating transmission cables 7 and 8 are fixed to the upper portion of the cable casing 52, and the inner wires 11 and 12 protruded respectively out of the outer casings 9 and 10 drawn into the cable casing 52. On the other hand, a pair of through holes 58 and 59 are perforated side by side in the pivotally movable plate 56 at its intermediate portion. Locking heads 11a and 12a are mounted on the corresponding other ends of the inner wires 11 and 12 movably passed through the through holes 58 and 59, with coil springs 60 and 61 as resilient members interposed between the corresponding locking heads 11a and 12a and the pivotally movable plates 56, respectively.

A through hole 62 is made in that portion of the pivotally movable plate 56 which is closest to the base end 56a, while a through hole 63 is in that portion of the pivotally movable plate 56 which is closest to a leading end 56b from the through holes 58 and 59.

The other ends of the respective outer casings 21 and 26 in the drive transmission cables 20 and 25 for the front and rear wheels are passed through the mounting member 51 and fixed to the lower portion of the casing 53 at places corresponding to the through holes 62 and 63. The inner wires 22 and 27 protruded respectively out of the corresponding other ends of the outer casings 21 and 26 are drawn into the casing 53 and passed through the corresponding through holes 62 and 63 from below. In other words, the inner wire 22 of the drive transmission cable 20 for the front wheel is passed through the through hole 62, and the locking head 22a mounted on the other end of the inner wire 22 engages the upper surface of the pivotally movable plate 56. On the other hand, the inner wire 27 of the drive transmission cable 25 for the rear wheel is passed through the through hole 63, and the locking head 27a mounted on the other end of the inner wire 27 engages the upper surface of the pivotally movable plate 56.

With this third embodiment, the operation of either the brake lever L1 or L2 allows the pivotally movable plate 56 to be swung upwardly. This causes the inner wires 22 and 27 of the drive transmission cables 20 and 25 for the front and rear wheels to be pulled, wherein the inner wire 27 of the drive transmission cable 25 for the rear wheel is pulled in a larger amount than the inner wire 22 of the drive transmission cable 20 for the front wheel because it is in engagement with the pivotally movable plate 56 at its portion closest to the leading end 56b. Accordingly, the rear wheel brake Br first starts to operate and then, the front wheel brake Bf starts to operate slightly behind. As a result, a satisfactory braking force is provided for the rear wheel Wr, while an excessive braking force is prevented from acting on the front wheel Wf, thus making it possible to reduce the danger of overturning.

Since the coil springs 60 and 61 are interposed respectively between the corresponding inner wires 11 and 12 in the operating transmission cables 7 and 8 and the pivotally movable plate 56, when only one of the brake levers L1 and L2 is operated, the other can be prevented from being rickety retracted.

Figure 7:
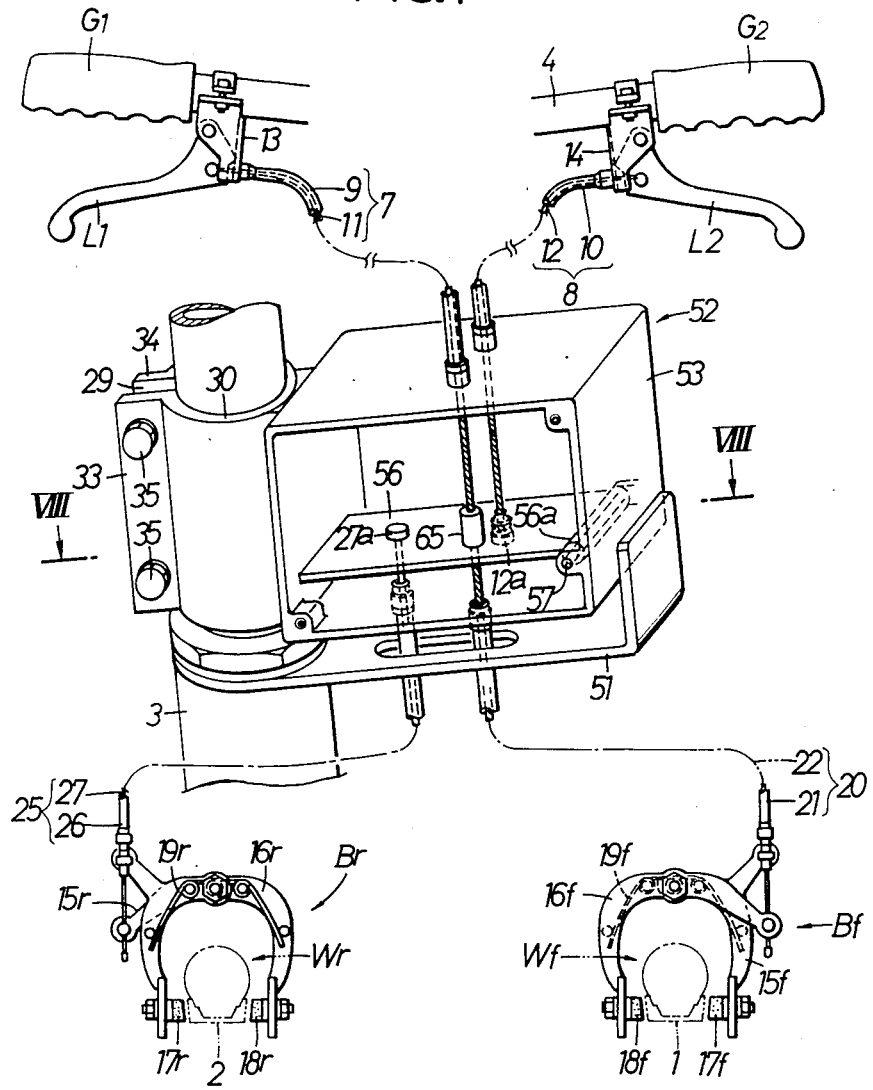
FIGS. 7, 8 and 9 illustrate a fourth embodiment of the present invention, FIG. 7 being a perspective view corresponding to FIG. 2, FIG. 8 being a sectional view taken along the line VIII-VIII in FIG. 7, and FIG. 9 being a sectional view taken along the line IX—IX in FIG. 8.
Figure 8:
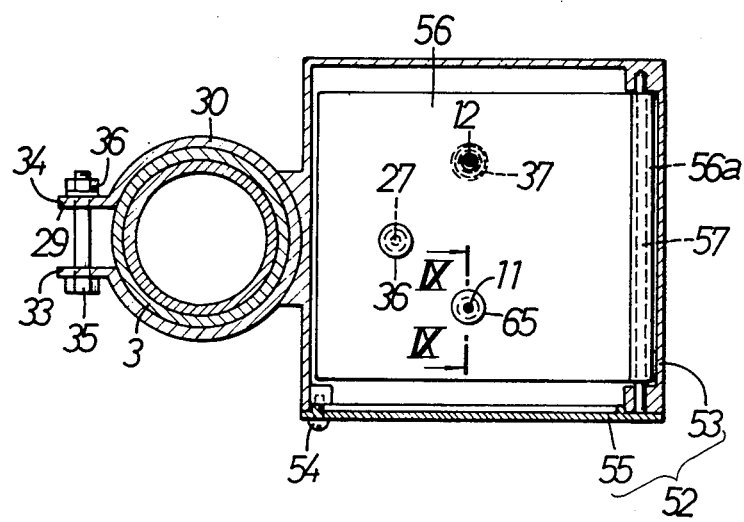
Figure 9:
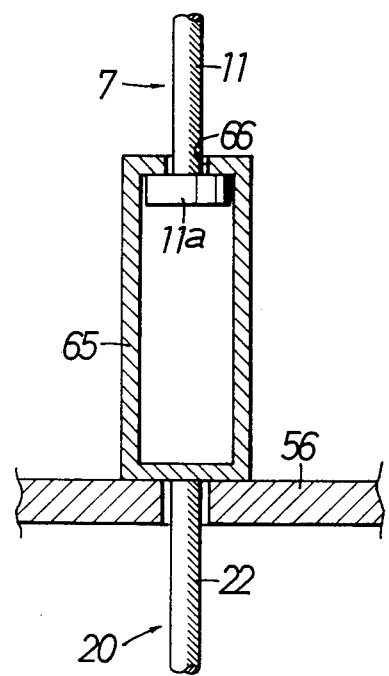

FIGS. 7, 8 and 9 illustrate a fourth embodiment of the present invention, in which like reference characters designate like parts as described in the previous embodiments.

The inner wire 22 in the drive transmission cable 20, connected to the front wheel brake Bf, is movably passed through the pivotally movable plate 56 from below and secured to the lower end of an engaging member 65 which is formed into a cylindrical shape closed at its opposite ends and is adapted to abut against that surface of the pivotally movable plate 56 which is at the side closest to a braking position, i.e., the upper surface thereof. A smaller diameter insert hole 66 is made in the upper end of the engaging member 65 for permiting the insertion of the inner wire 11 in the operating transmission cable 7 connected to the brake lever L1. The locking head 11a, adapted to engage the upper closed end of the engaging member 65, is secured to the end of the inner wire 11 inserted through the insert hole 66 into the engaging member 65.

Thus, as the brake lever L1 is operated to pull the inner wire 11 of the operating transmission cable 7, the locking head 11a is brought into engagement with the upper portion of the engaging member 65 to move the engaging member 65 upwardly, whereby the inner wire 22 of the drive transmission cable 20 is pulled to actuate the front wheel brake Bf. In this case, the engaging member 65 merely raises from the upper surface of the pivotally movable plate 56, but may not exert any influence on the pivotally movable plate 56.

The inner wire 27 in the transmission cable 25 connected to the rear wheel brake Br is movably passed through the pivotally movable plate 56 from below, and the locking head 27a, adapted to abut against the upper surface of the pivotally movable plate 56, is secured to that end of the inner wire 27 which is projected upwardly from the pivotally movable plate 56. The other end of the inner wire 12 in the operating transmission cable 8 connected to the brake lever L2 is movably passed through the pivotally movable plate 56 from above, and the locking head 12a, adapted to abut against the lower surface of the pivotally movable plate 56, is secured to the end of the inner wire 12 protruded downwardly from the pivotally movable plate 56.

Therefore, the rear wheel brake Br and the brake lever L2 are interconnected by the operating and drive transmission cables 8 and 25 through the pivotally movable plate 56 interposed therebetween.

Description will now be made of this embodiment. As the one brake lever L1 is operated, the engaging member 65 is pulled by the inner wire 11 of the operating transmission cable 7, and the inner wire 22 of the drive transmission cable 20 is correspondingly pulled to actuate only the front wheel brake Bf.

As the other brake lever L2 is operated, the inner wire 12 of the operating transmission cable 8 allows the pivotally movable plate 56 to be pivotally moved from a nonbraking position to a braking position. This causes the inner wire 27 of the drive transmission cable 25 to be pulled to actuate the rear wheel brake Br. Moreover, the pivotal movement of the pivotally movable plate 56 causes the engaging member 65 to be pushed upwardly, so that the inner wire 22 of the drive transmission cable 20 is also pulled to actuate the front wheel brake Bf.

Therefore, upon the operation of the one brake lever L1, only the front wheel brake Bf is actuated, whereas upon the operation of the other brake lever L2, both of the front and rear brakes Bf and Br are actuated.

With such a brake system, the other brake lever L2 may be operated during the travelling of the bicycle on a normal road to actuate both the front and rear brakes Bf and Br, so that an effective braking can be provided. In the case where a lateral slipping may occur when the rear brake Br is operated during the travelling of the bicycle on a gravel road, the one brake lever L1 may be operated to actuate the front brake Bf, so that the bicycle can be stopped while preventing such a lateral slipping. In addition, it is also possible to operate both the brake levers L1 and L2 together to actuate both the front and rear wheel brakes Bf and Br together, with the braking force of the front wheel brake Bf larger than that of the rear wheel brake Br.

Alternatively, the engaging member 56 may be connected to the rear wheel brake Br by the drive transmission cable 25, and the front wheel brake Bf may be connected to the pivotally movable plate 56 by the drive transmission cable 20. If so, the operation of the one brake lever L1 allows only the rear wheel brake Br to be actuated, while the operation of the other brake lever L2 allows both the front and rear wheel brakes Bf and Br to be actuated.

With such a brake system, when the bicycle is intended to be quietly stopped, it can be braked by only the rear brake Br, and both the front and rear wheel brakes Bf and Br can be also actuated with the larger braking force on the rear wheel Wr than on the front wheel Wf to provide an effective braking.

Alternatively, the brake levers L1 and L2 may be mounted in the reversed positions to those in the above embodiments.

What is claimed is:

1. A brake system for bicycles, comprising:
   a pair of brakes for front and rear wheels;
   a pair of brake levers disposed on opposite ends of a handlebar; and
   cables for connecting the brake levers with the brakes;
   wherein said cables comprise a pair of operating transmission cables connected to the brake levers, respectively, and a pair of drive transmission cables connected to the brakes, respectively, a pivotable plate being interposed between and associated with the said pair of operating transmission cables and said pair of drive transmission cables, said plate being pivotable around an axis and providing such operative connection between the cables that when at least one of the operating transmission cables is subject to a pulling operation by operating at least one of the brake levers, both pair of drive transmission cables are pulled via the plate with a time lag in operation therebetween to first actuate the brake for said rear wheel and then the brake for said front wheel; and
   wherein coil springs are interposed between one end of the operating transmission cables and said plate, respectively, for keeping each of the operating transmission cables from being pulled toward the associated brake lever when only its opponent operating transmission cable is pulled to pivot said plate by operation of the brake lever associated with said opponent cable, as well as for smoothly transmitting linear pulling movements of the operating transmission cables to the plate as it pivots.

2. A brake system according to claim 1, wherein said coil springs are interposed between locking heads fixed to said one end of the operating transmission cables and said plate.

3. A brake system according to claim 2, wherein said plate is contained in a cable casing which is fixed to a body frame.

4. A brake system according to claim 3, wherein each of the operating transmission cables comprises an outer casing and an inner wire movably inserted in the outer casing, said outer casing being fixed at one end to the cable casing and at the other end to a mounting member which mounts the associated brake lever to said handlebar while said inner wire projecting at one end into said cable casing for connection to the plate and at the other end being connected to its associated brake lever.

* * * * *